US008928280B2

(12) United States Patent
Sugiyama et al.

(10) Patent No.: US 8,928,280 B2
(45) Date of Patent: Jan. 6, 2015

(54) POWER FEEDING DEVICE, VEHICLE EQUIPPED WITH THE SAME, AND POWER FEEDING METHOD

(75) Inventors: Yoshinobu Sugiyama, Toyota (JP); Wanleng Ang, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/876,245

(22) PCT Filed: Oct. 26, 2010

(86) PCT No.: PCT/JP2010/068970
§ 371 (c)(1),
(2), (4) Date: Mar. 27, 2013

(87) PCT Pub. No.: WO2012/056516
PCT Pub. Date: May 3, 2012

(65) Prior Publication Data
US 2013/0207607 A1      Aug. 15, 2013

(51) Int. Cl.
*H02J 7/00* (2006.01)
(52) U.S. Cl.
USPC ........................................................ 320/109
(58) Field of Classification Search
CPC ...................................................... Y02T 90/14
USPC ........................................................ 320/109
See application file for complete search history.

(56) References Cited

U.S. PATENT DOCUMENTS

| 8,242,627 B2* | 8/2012 | Ichikawa et al. ............... 320/136 |
| 2004/0232881 A1* | 11/2004 | Amano et al. ................. 320/104 |
| 2005/0141154 A1* | 6/2005 | Consadori et al. ............... 361/62 |
| 2008/0284376 A1* | 11/2008 | Ito et al. ......................... 320/134 |
| 2009/0121677 A1* | 5/2009 | Inoue et al. .................... 320/108 |
| 2011/0187184 A1 | 8/2011 | Ichikawa |

FOREIGN PATENT DOCUMENTS

| JP | A-2001-008380 | 1/2001 |
| JP | A-2007-252117 | 9/2007 |
| JP | A-2009-225587 | 10/2009 |
| JP | A-2010-093891 | 4/2010 |
| JP | A-2010-110044 | 5/2010 |
| JP | A-2010-187466 | 8/2010 |
| JP | A-2010-195056 | 9/2010 |

* cited by examiner

*Primary Examiner* — Yalkew Fantu
(74) *Attorney, Agent, or Firm* — Oliff PLC

(57) ABSTRACT

A switching relay is configured to switch between a first power feeding path for feeding power from a charge inlet to an outlet and a second power feeding path for feeding power from a power storage device to the outlet. A PM-ECU controls the switching relay to switch between the first power feeding path and the second power feeding path, based on a result of comparison between a power cost in a case where the power is fed to the outlet through the first power feeding path and a power cost in a case where the power is fed to the outlet through the second power feeding path.

15 Claims, 6 Drawing Sheets

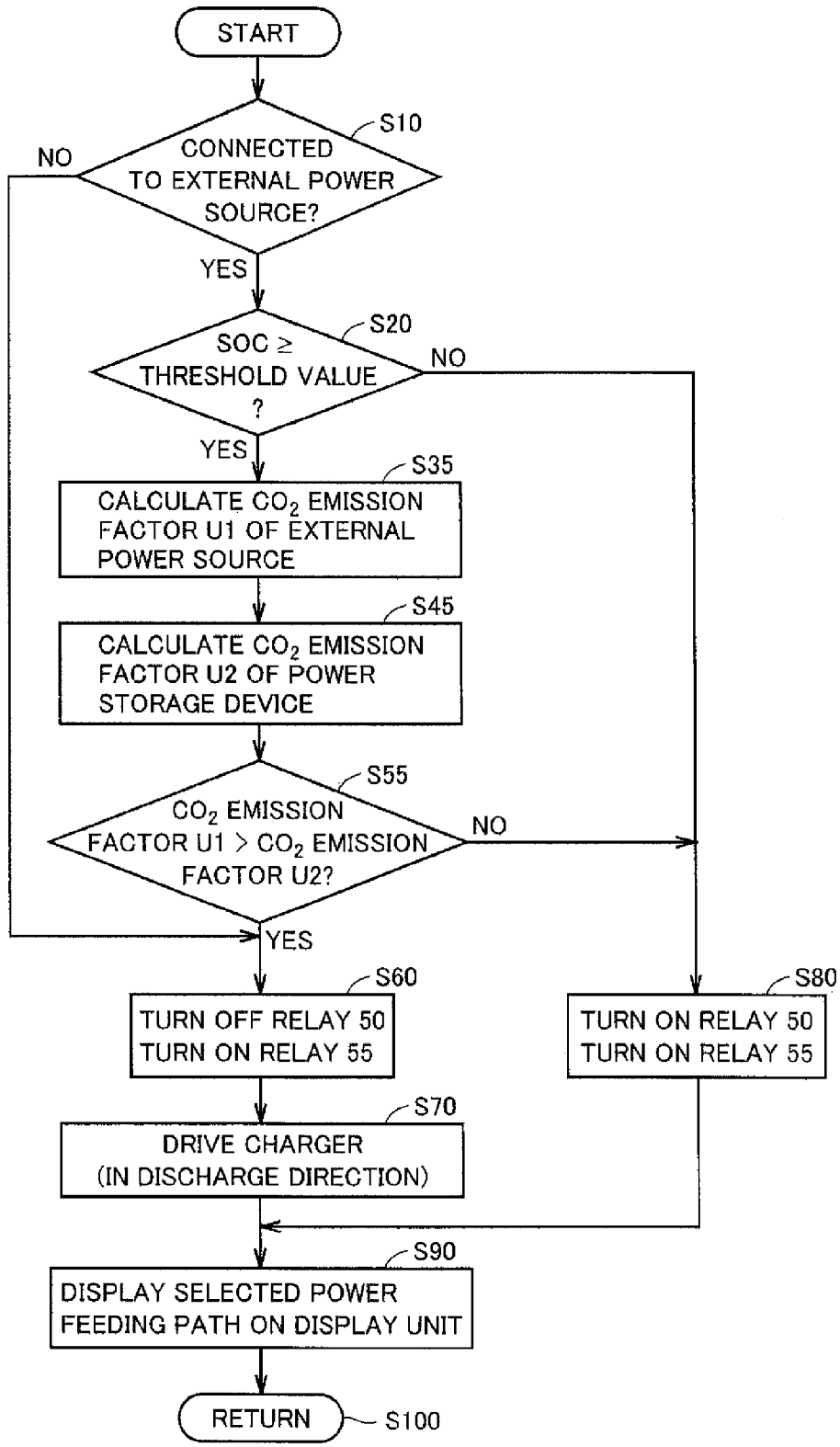

POWER FEEDING DEVICE, VEHICLE EQUIPPED WITH THE SAME, AND POWER FEEDING METHOD

TECHNICAL FIELD

The present invention relates to a power feeding device, a vehicle equipped with the same, and a power feeding method. In particular, the present invention relates to a power feeding device for feeding power to an outlet provided in a vehicle, the vehicle equipped with the same, and a power feeding method.

BACKGROUND ART

Electrically powered vehicles such as an electric vehicle and a hybrid vehicle traveling by driving a motor using electric power stored in a power storage device have been known. For such electrically powered vehicles, configurations of charging a power storage device by a power source external to a vehicle (hereinafter also referred to as an "external power source") have been proposed (hereinafter, charging of a power storage device by an external power source will also be referred to as "external charging").

For example, Japanese Patent Laying-Open No. 2009-225587 (Patent Literature 1) discloses a configuration of an electrically powered vehicle for which such external charging can be performed. The publication also discloses a configuration that an AC outlet is connected between a charge connector and a charger (power converter) via a relay. Further, the publication discloses a configuration that, if an electric system of the vehicle is activated during external charging, the relay is turned on, and, if a power failure occurs in an external power source, power is fed from a battery via the charger (power converter) to the AC outlet (see Patent Literature 1).

CITATION LIST

Patent Literature

PTL 1: Japanese Patent Laying-Open No. 2009-225587
PTL 2: Japanese Patent Laying-Open No. 2010-93891

SUMMARY OF INVENTION

Technical Problem

In the electrically powered vehicle described in the above publication, power is supplied from the external power source to the AC outlet unless a power failure occurs in the external power source. However, there is a possibility that power feeding from the external power source is not necessarily appropriate.

For example, if the unit price of power of a system power source as the external power source varies depending on the time zone, there is a possibility that the unit price of power stored in a power storage device is lower than the unit price of the power of the external power source in a case where power feeding to the AC outlet is performed. Further, if the component percentages of power generation methods (such as nuclear power generation, thermal power generation, and the like) of the system power source vary depending on the time zone, there is also a possibility that the carbon dioxide (hereinafter referred to as "$CO_2$") emission factor (i.e., the amount of $CO_2$ emission per unit amount of electric power) of the power stored in the power storage device is smaller than the $CO_2$ emission factor of the external power source in a case where power feeding to the outlet is performed. The above publication does not particularly consider these points.

Accordingly, one object of the present invention is to provide a power feeding device for implementing suitable power feeding to an outlet provided in a vehicle, and the vehicle equipped with the same.

Further, another object of the present invention is to provide a power feeding method for implementing suitable power feeding to an outlet provided in a vehicle.

Solution to Problem

According to the present invention, a power feeding device is a power feeding device for feeding power to an outlet provided in a vehicle, and includes a power receiving unit, a rechargeable power storage device, a charger, a switching circuit, and a control device. The power receiving unit receives supply power supplied from an external power source. The charger is provided between the power receiving unit and the power storage device, and configured to convert the supply power from the external power source into charging power for the power storage device and charge the power storage device. The switching circuit is configured to switch between a first power feeding path for feeding power from the power receiving unit to the outlet and a second power feeding path for feeding power from the power storage device to the outlet. The control device controls the switching circuit to switch between the first power feeding path and the second power feeding path, based on a result of comparison between a first evaluation value indicating a value of a predetermined index in a case where the power is fed to the outlet through the first power feeding path and a second evaluation value indicating a value of the index in a case where the power is fed to the outlet through the second power feeding path.

Preferably, the index is a power cost.

More preferably, the control device controls the switching circuit to select one of the first and second power feeding paths that has a lower power cost.

Further, preferably, the index is a $CO_2$ emission factor.

More preferably, the control device controls the switching circuit to select one of the first and second power feeding paths that has a lower $CO_2$ emission factor.

Preferably, if the power storage device has a state of charge (i.e., SOC) lower than a predetermined threshold value, the control device controls the switching circuit to select the first power feeding path.

Preferably, the switching circuit is provided between the power receiving unit and the charger. The outlet is connected to the switching circuit. The charger is configured to be capable of converting power bi-directionally. The second power feeding path includes the charger.

More preferably, the control device calculates the second evaluation value, considering a power conversion efficiency of the charger.

Preferably, the power feeding device further includes a display unit. The display unit displays to a user which of the first power feeding path and the second power feeding path is selected.

Further, according to the present invention, a vehicle includes any power feeding device described above, and an outlet receiving power from the power feeding device.

Further, according to the present invention, a power feeding method is a power feeding method for feeding power to an outlet provided in a vehicle. The vehicle includes a power receiving unit, a rechargeable power storage device, a charger, and a switching circuit. The power receiving unit receives supply power supplied from an external power source. The charger is provided between the power receiving unit and the power storage device, and configured to convert the supply power from the external power source into charging power for the power storage device and charge the power storage device. The switching circuit is configured to switch between a first power feeding path for feeding power from the power receiving unit to the outlet and a second power feeding path for feeding power from the power storage device to the outlet. The power feeding method includes the steps of calculating a first evaluation value indicating a value of a predetermined index in a case where the power is fed to the outlet through the first power feeding path, calculating a second evaluation value indicating a value of the index in a case where the power is fed to the outlet through the second power feeding path, and switching between the first power feeding path and the second power feeding path by controlling the switching circuit based on a result of comparison between the first evaluation value and the second evaluation value.

Preferably, the index is a power cost.

Further, preferably, the index is a CO2 emission factor.

Preferably, the switching circuit is provided between the power receiving unit and the charger. The outlet is connected to the switching circuit. The charger is configured to be capable of converting power bi-directionally. The second power feeding path includes the charger. The step of calculating the second evaluation value includes the step of calculating the second evaluation value, considering a power conversion efficiency of the charger.

Preferably, the power feeding method further includes the step of displaying to a user which of the first power feeding path and the second power feeding path is selected.

Advantageous Effects of Invention

In the present invention, switching between the first power feeding path and the second power feeding path is performed based on the result of comparison between the first evaluation value indicating a value of a predetermined index (the power cost or CO2 emission factor) in the case where the power is fed to the outlet through the first power feeding path and the second evaluation value indicating a value of the index in the case where the power is fed to the outlet through the second power feeding path. Thereby, a power feeding path that is optimal in terms of the index can be selected. Therefore, according to the present invention, suitable power feeding to the outlet provided in the vehicle can be implemented.

BRIEF DESCRIPTION OF DRAWINGS

FIG. 6 is a flowchart for illustrating a procedure of a process performed in a switching control unit of the PM-ECU shown in FIG. 5.

DESCRIPTION OF EMBODIMENTS

Figure 1:
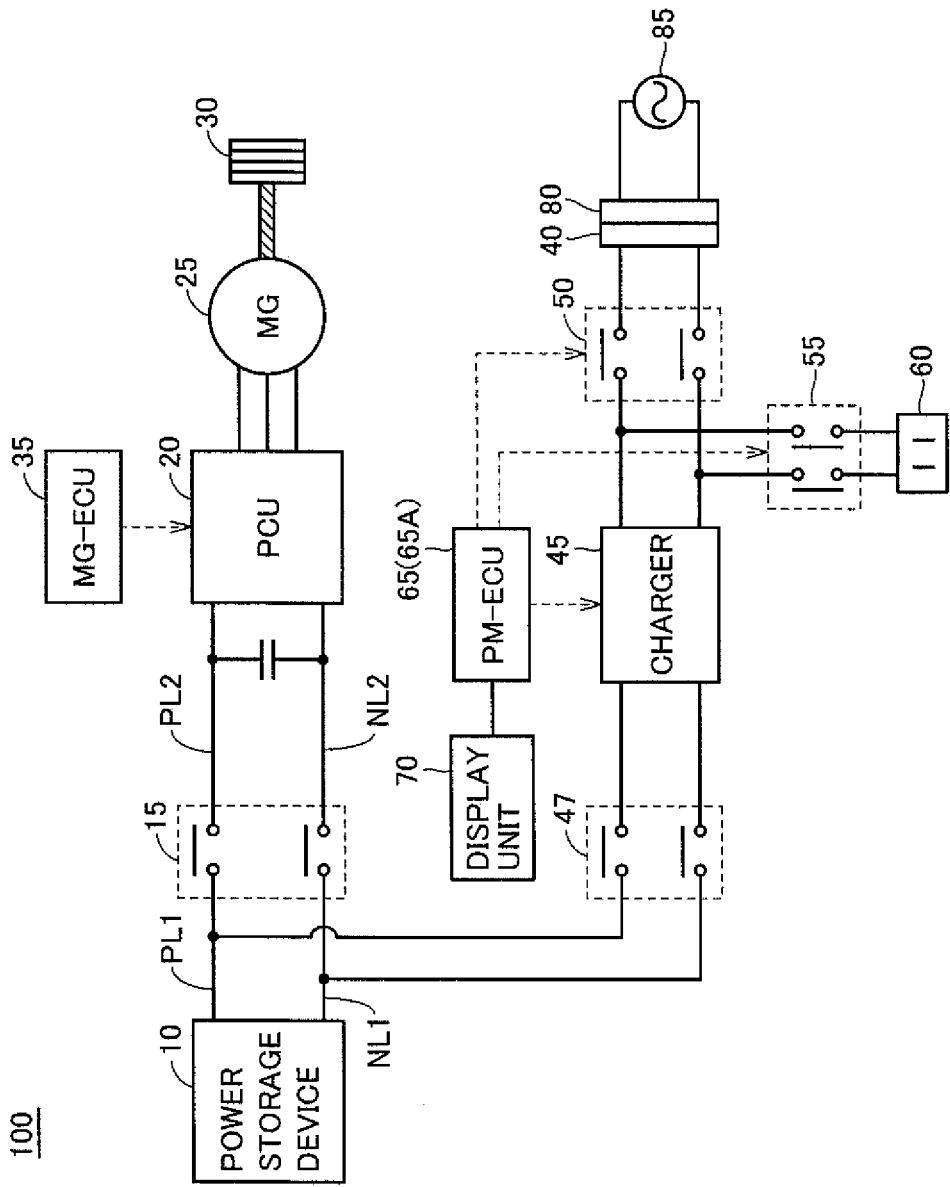
FIG. 1 is an overall block diagram of a vehicle equipped with a power feeding device in accordance with Embodiment 1 of the present invention.

Hereinafter, embodiments of the present invention will be described in detail with reference to the drawings, in which identical or corresponding parts will be designated by the same reference numerals, and the description thereof will not be repeated.

[Embodiment 1]

FIG. 1 is an overall block diagram of a vehicle equipped with a power feeding device in accordance with Embodiment 1 of the present invention. Referring to FIG. 1, a vehicle 100 includes a power storage device 10, a system main relay (hereinafter referred to as an "SMR") 15, a power control unit (hereinafter referred to as a "PCU") 20, a motor generator 25, drive wheels 30, and an MG-ECU 35. Vehicle 100 further includes a charge inlet 40, a charger 45, a charge relay 47, switching relays 50, 55, an outlet 60, a PM-ECU 65, and a display unit 70.

Power storage device 10 is a direct-current (DC) power source storing power for traveling, and is composed of, for example, a secondary battery such as a nickel hydride battery and a lithium ion battery. Power storage device 10 is charged by an external power source 85, using charger 45. During braking of vehicle 100 and during acceleration reduction on a descending slope, power storage device 10 is also charged by receiving power generated by motor generator 25 from PCU 20. Then, power storage device 10 outputs the stored power to PCU 20. Power storage device 10 can also supply the stored power to outlet 60 via charger 45. Instead of a secondary battery, a large-capacity capacitor can also be employed as power storage device 10.

SMR 15 is provided between power storage device 10 and PCU 20. SMR 15 enters an ON state when a vehicle system is activated to cause vehicle 100 to travel, and is in an OFF state while power storage device 10 is charged by charger 45.

PCU 20 receives supply of power from power storage device 10, and drives motor generator 25 based on a control signal from MG-ECU 35. Further, during braking of vehicle 100 and the like, PCU 20 converts power generated by motor generator 25 receiving kinetic energy from drive wheels 30 to have a voltage level, and outputs it to power storage device 10. PCU 20 is composed of, for example, a three-phase PWM inverter including switching elements for three phases. It is to be noted that a boost converter may be provided between the three-phase PWM inverter and power storage device 10.

Motor generator 25 is a motor generator that can perform a power running operation and a regenerative operation, and is composed of, for example, a three-phase alternating-current (AC) synchronous motor generator having a permanent magnet embedded in a rotor. Motor generator 25 is driven by PCU 20, generates drive torque for traveling, and drives drive wheels 30. Further, during braking of vehicle 100 and the like, motor generator 25 receives kinetic energy of vehicle 100 from drive wheels 30, and generates power.

MG-ECU 35 is composed of an electronic control unit (hereinafter referred to as an "ECU"), and controls an operation of PCU 20 by software processing performed by executing a prestored program in a central processing unit (CPU) and/or hardware processing performed by a dedicated electronic circuit. Specifically, MG-ECU 35 generates a control signal for driving motor generator 25 by PCU 20 (for example, a pulse width modulation (PWM) signal), and outputs the generated control signal to PCU 20.

Charge inlet 40 is configured to be capable of fitting a connector 80 connected to external power source 85. Charge inlet 40 receives supply power supplied from external power source 85, and outputs it to charger 45. The supply power from external power source 85 can also be output from charge inlet 40 to outlet 60. Instead of charge inlet 40, a charge plug configured to be capable of being connected to an outlet of external power source 85 may be provided.

Charger 45 is configured to receive the power from external power source 85 and charge power storage device 10. Specifically, charger 45 converts the power supplied from external power source 85 into charging power for power storage device 10, based on a control signal from PM-ECU 65. Further, charger 45 is configured to be capable of converting power bi-directionally, and can convert power received from power storage device 10 into AC power equivalent to that of external power source 85 and output it to outlet 60. The configuration of charger 45 will be described later.

Charge relay 47 is provided between charger 45 and power source lines PL1, NL1 wired between power storage device 10 and SMR 15. Charge relay 47 is in an ON state during external charging, and enters an OFF state when the external charging is terminated. Charge relay 47 is also in an ON state while the power is supplied from power storage device 10 via charger 45 to outlet 60.

Switching relay 50 is provided on an electric path between charge inlet 40 and charger 45. Switching relay 55 has one end connected to an electric path between charger 45 and switching relay 50, and the other end connected to outlet 60. Switching relays 50, 55 are operated in response to commands from PM-ECU 65. Switching relays 50, 55 are provided to switch between a path feeding the power from charge inlet 40 connected to external power source 85 to outlet 60 (hereinafter referred to as a "first power feeding path") and a path feeding the power from power storage device 10 via charger 45 to outlet 60 (hereinafter referred to as a "second power feeding path"). Outlet 60 is configured to fit a power source plug of a home electric appliance or the like.

PM-ECU 65 is composed of an ECU, and controls operations of charger 45 and switching relays 50, 55 by software processing performed by executing a prestored program in the CPU and/or hardware processing performed by a dedicated electronic circuit. Specifically, PM-ECU 65 generates the control signal for operating charger 45 to convert the supply power from external power source 85 into the charging power for power storage device 10 during the external charging, and outputs the control signal to charger 45. On this occasion, PM-ECU 65 turns on switching relay 50.

Further, PM-ECU 65 calculates a power cost C1 in a case where the power is fed to outlet 60 through the first power feeding path and a power cost C2 in a case where the power is fed to outlet 60 through the second power feeding path, by a method described later. Then, PM-ECU 65 controls switching relays 50, 55 to switch between the first power feeding path and the second power feeding path, based on a result of comparison between power costs C1 and C2.

Specifically, if power cost C1 is lower than power cost C2, PM-ECU 65 selects the first power feeding path by turning on switching relays 50, 55. On the other hand, if power cost C2 is lower than power cost C1, PM-ECU 65 selects the second power feeding path by turning off switching relay 50 and turning on switching relay 55. When the second power feeding path is selected, PM-ECU 65 generates a control signal for operating charger 45 such that the power is fed from power storage device 10 to outlet 60, and outputs the control signal to charger 45.

In addition, PM-ECU 65 generates a signal indicating which of the first power feeding path and the second power feeding path is selected, and outputs the generated signal to display unit 70. Display unit 70 displays to a user which of the first power feeding path and the second power feeding path is selected, based on the signal from PM-ECU 65.

Figure 2:
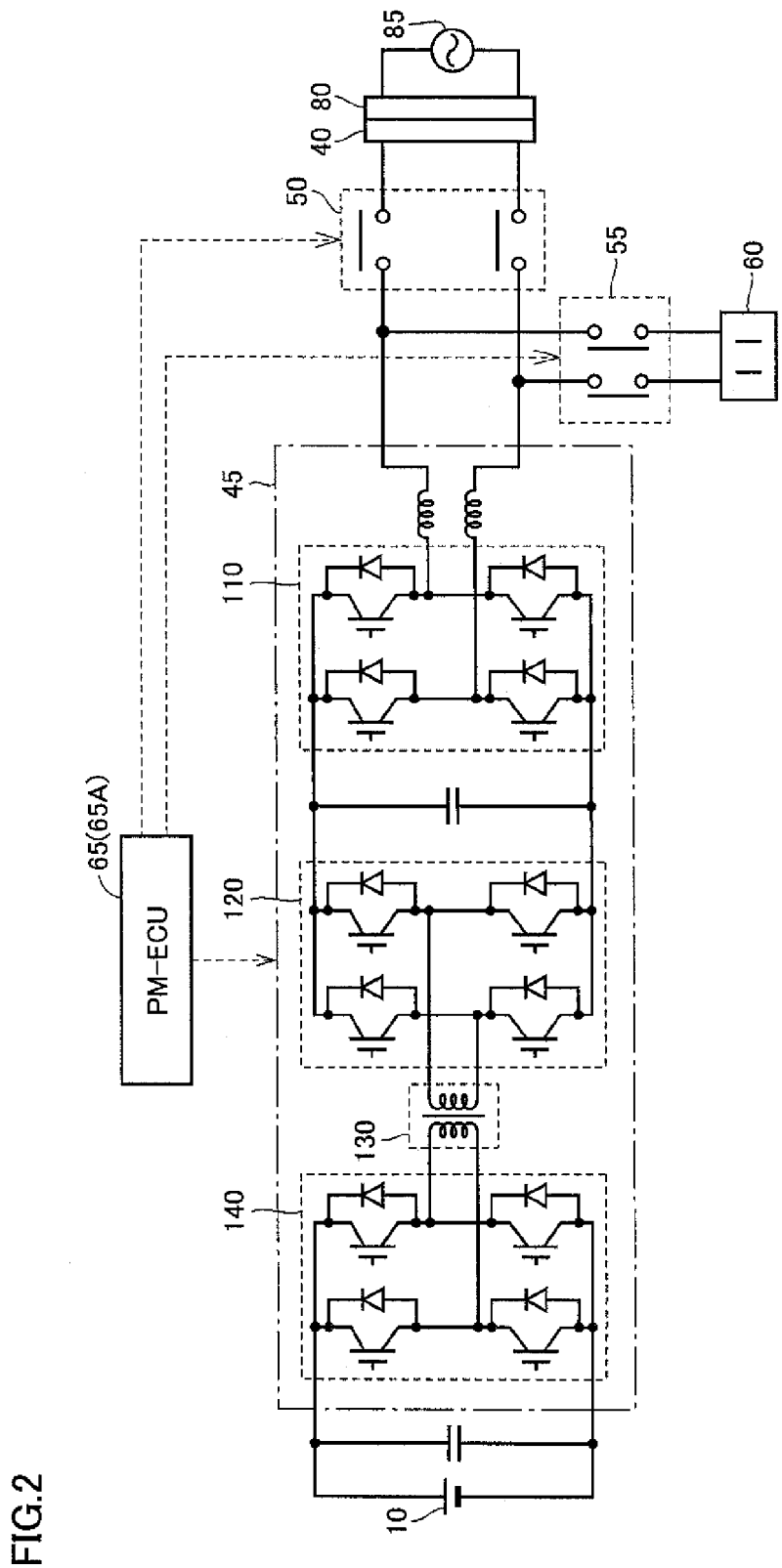
FIG. 2 is a circuit diagram of a charger shown in FIG. 1.

FIG. 2 is a circuit diagram of charger 45 shown in FIG. 1. Referring to FIG. 2, charger 45 includes AC/DC conversion units 110, 140, a DC/AC conversion unit 120, and an insulation transformer 130. Each of AC/DC conversion units 110, 140 and DC/AC conversion unit 120 is composed of a single-phase bridge circuit capable of converting power bi-directionally.

AC/DC conversion unit 110 converts AC power supplied from external power source 85 into DC power and outputs it to DC/AC conversion unit 120, based on a control signal from PM-ECU 65. AC/DC conversion unit 110 can also convert DC power received from DC/AC conversion unit 120 into AC power equivalent to that of external power source 85, and output it to outlet 60.

DC/AC conversion unit 120 converts the DC power received from AC/DC conversion unit 110 into AC power and outputs it to insulation transformer 130, based on a control signal from PM-ECU 65. DC/AC conversion unit 120 can also convert AC power received from insulation transformer 130 into DC power, and output it to AC/DC conversion unit 110.

Insulation transformer 130 includes a core made of a magnetic material, and a primary coil and a secondary coil wound around the core. The primary coil and the secondary coil are electrically insulated, and are connected to DC/AC conversion unit 120 and AC/DC conversion unit 140, respectively. Insulation transformer 130 converts the AC power from DC/AC conversion unit 120 to have a voltage level corresponding to a turn ratio between the primary coil and the secondary coil, and outputs it to AC/DC conversion unit 140. Insulation transformer 130 can also convert AC power from AC/DC conversion unit 140 to have a voltage level corresponding to a turn ratio between the secondary coil and the primary coil, and output it to DC/AC conversion unit 120.

AC/DC conversion unit 140 converts AC power received from insulation transformer 130 into DC power and outputs it to power storage device 10, based on a control signal from PM-ECU 65. AC/DC conversion unit 140 can also convert DC power supplied from power storage device 10 into AC power, and output it to insulation transformer 130.

In Embodiment 1, when connector 80 is connected to charge inlet 40, the power supplied from external power source 85 can be supplied to outlet 60 by turning on switching relays 50, 55 (i.e., the first power feeding path). Further, the power can be fed from power storage device 10 via charger 45 to outlet 60 by turning off switching relay 50 and turning on switching relay 55 (i.e., the second power feeding path).

Here, in Embodiment 1, power cost C1 in the case where the power is fed to outlet 60 through the first power feeding path and power cost C2 in the case where the power is fed to outlet 60 through the second power feeding path are calculated in PM-ECU 65. Then, power cost C1 is compared with power cost C2, and switching relays 50, 55 are controlled by PM-ECU 65 to select a power feeding path that has a lower power cost.

Figure 3:
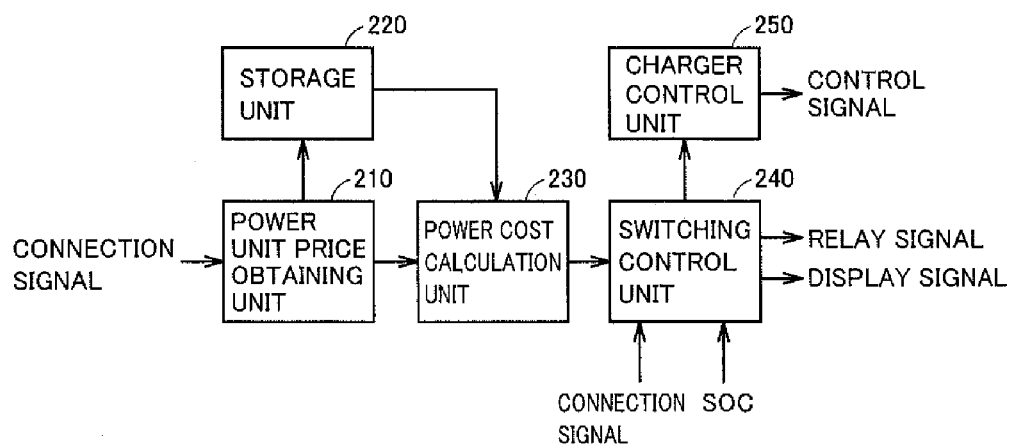
FIG. 3 is a functional block diagram of a PM-ECU.

FIG. 3 is a functional block diagram of PM-ECU 65. Referring to FIG. 3, PM-ECU 65 includes a power unit price obtaining unit 210, a storage unit 220, a power cost calculation unit 230, a switching control unit 240, and a charger control unit 250.

Power unit price obtaining unit 210 receives a connection signal indicating whether or not connector 80 of external power source 85 is connected to charge inlet 40. The connection signal is generated, for example, using a proximity switch in which a signal state is changed when connector 80 is connected to charge inlet 40. Upon receiving the connection signal, power unit price obtaining unit 210 obtains a power unit price (yen/kWh) of external power source 85 on that occasion. For example, power unit price obtaining unit 210 may obtain the power unit price of external power source 85 by receiving information on the power unit price transmitted momentarily from an electric power company and the like, using a communication device not shown. Alternatively, information on the power unit price of external power source 85 for each time zone may be retained beforehand in the vehicle in the form of a map or the like, and power unit price obtaining unit 210 may obtain the power unit price of external power source 85 in accordance with the time when it receives the connection signal.

Storage unit 220 is a rewritable nonvolatile memory. Storage unit 220 stores a power unit price of external power source 85 in a case where external charging by external power source 85 is performed. That is, storage unit 220 stores a power unit price PU (yen/kWh) of the power currently stored in power storage device 10, obtained by power unit price obtaining unit 210 during the external charging. Power unit price PU may be an average value during the external charging, or may be a value at prescribed timing during the external charging, such as at the start of the external charging.

Power cost calculation unit 230 calculates power cost C1 (yen/kWh) in the case where the power is fed to outlet 60 through the first power feeding path, and power cost C2 (yen/kWh) in the case where the power is fed to outlet 60 through the second power feeding path. Specifically, power cost calculation unit 230 calculates a power unit price of external power source 85 received from power unit price obtaining unit 210 in response to connection of external power source 85 to charge inlet 40, as power cost C1. On the other hand, concerning power cost C2, power cost calculation unit 230 reads power unit price PU of the power currently stored in power storage device 10 from storage unit 220, and calculates power cost C2 by the following equation, considering a power conversion efficiency of charger 45:

$$C2 = PU \times (100/\text{conversion efficiency A}) \times (100/\text{conversion efficiency B}) \quad (1),$$

where a conversion efficiency A (%) represents a power conversion efficiency of charger 45 in a case where the supply power from external power source 85 is converted by charger 45 into the charging power for power storage device 10, and a conversion efficiency B (%) represents a power conversion efficiency of charger 45 in a case where the power is supplied from power storage device 10 via charger 45 to outlet 60.

Switching control unit 240 receives power costs C1, C2 calculated by power cost calculation unit 230. Switching control unit 240 also receives the connection signal indicating whether or not connector 80 of external power source 85 is connected to charge inlet 40, and an SOC indicating a state of charge of power storage device 10 (represented, for example, by a percentage with respect to a capacity of power storage device 10). The SOC can be calculated using various known techniques, based on a voltage VB, an input/output current, and the like of power storage device 10.

Switching control unit 240 generates a relay signal for switching between the first and second power feeding paths based on these pieces of information by a method described later, and outputs the generated relay signal to switching relays 50, 55. Then, if the second power feeding path is selected, switching control unit 240 notifies that effect to charger control unit 250. Further, switching control unit 240 generates a display signal for displaying on display unit 70 which of the first power feeding path and the second power feeding path is selected, and outputs the generated display signal to display unit 70.

Charger control unit 250 generates the control signal for operating charger 45 to convert the supply power from external power source 85 into the charging power for power storage device 10 during the external charging, and outputs the generated control signal to charger 45. Further, if charger control unit 250 receives from switching control unit 240 a notification that the second power feeding path is selected, charger control unit 250 generates the control signal for operating charger 45 such that the power is fed from power storage device 10 to outlet 60, and outputs the generated control signal to charger 45.

Figure 4:
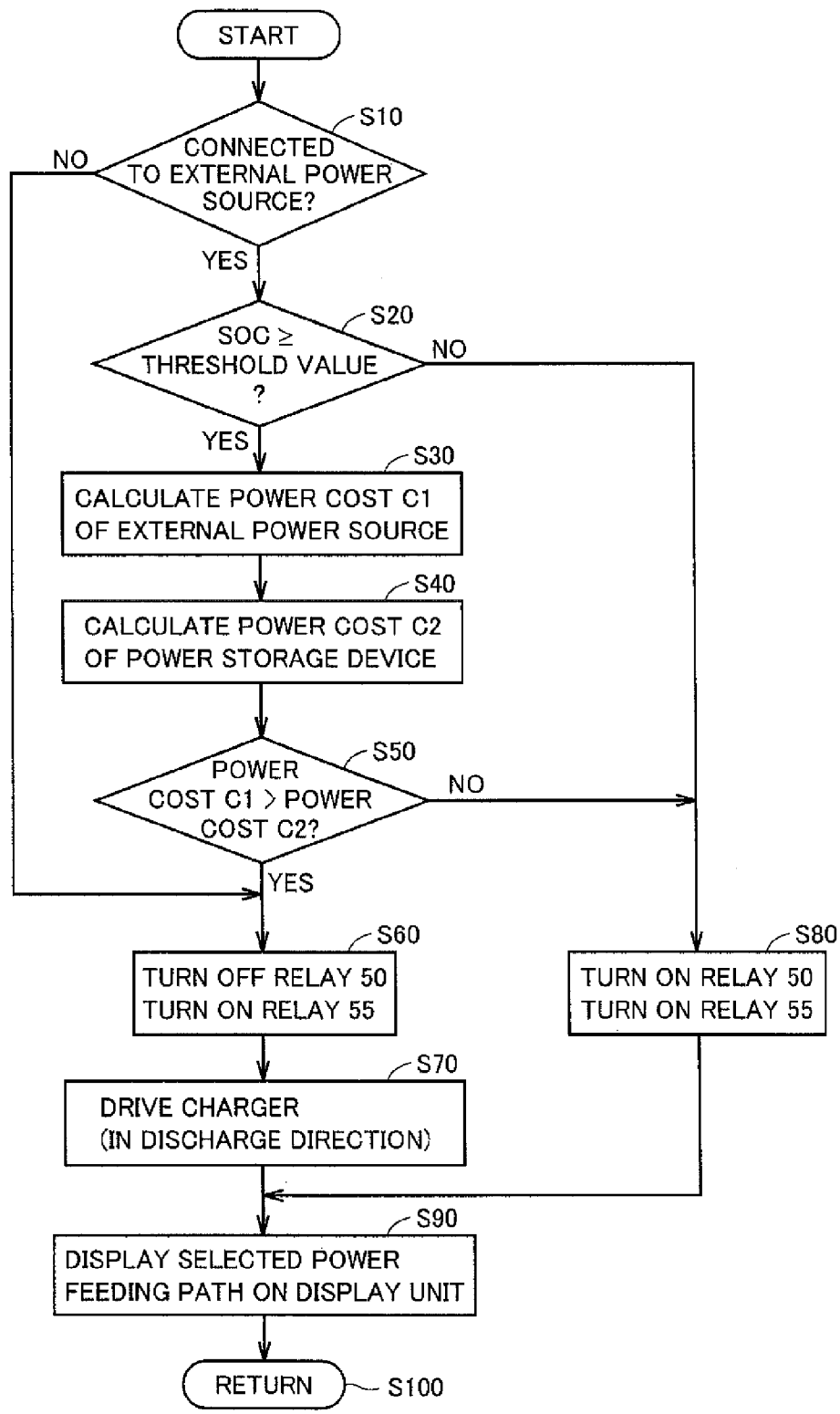
FIG. 4 is a flowchart for illustrating a procedure of a process performed in a switching control unit of the PM-ECU shown in FIG. 3.

FIG. 4 is a flowchart for illustrating a procedure of a process performed in switching control unit 240 of PM-ECU 65 shown in FIG. 3. Referring to FIG. 4, PM-ECU 65 determines whether or not charge inlet 40 is connected to external power source 85, based on the connection signal indicating a connection state between charge inlet 40 and connector 80 of external power source 85 (step S10). If PM-ECU 65 determines that charge inlet 40 is not connected to external power source 85 (NO in step S10), PM-ECU 65 advances the process to step S60 (described later).

If PM-ECU 65 determines in step S10 that charge inlet 40 is connected to external power source 85 (YES in step S10), PM-ECU 65 determines whether or not the SOC of power storage device 10 is not less than a predetermined threshold value (step S20). The threshold value is set as appropriate as a lower limit value of the SOC at which the power can be fed from power storage device 10 to outlet 60. If PM-ECU 65 determines that the SOC is lower than the threshold value (NO in step S20), PM-ECU 65 advances the process to step S80 (described later).

If PM-ECU 65 determines in step S20 that the SOC is not less than the threshold value (YES in step S20), PM-ECU 65 calculates power cost C1 (yen/kWh) of external power source 85, that is, power cost C1 in the case where the power is fed to outlet 60 through the first power feeding path (step S30). Subsequently, PM-ECU 65 calculates power cost C2 (yen/kWh) of power storage device 10, that is, power cost C2 in the case where the power is fed to outlet 60 through the second power feeding path, using equation (1) described above (step S40).

Then, PM-ECU 65 compares power cost C1 with power cost C2, and determines whether or not power cost C1 is higher than power cost C2 (step S50). If PM-ECU 65 determines that power cost C1 is higher than power cost C2 (YES in step S50), PM-ECU 65 turns off switching relay 50 and turns on switching relay 55 (FIGS. 1, 2) (step S60). Thereby, the second power feeding path feeding the power from power storage device 10 via charger 45 to outlet 60 is selected. Thereafter, PM-ECU 65 drives charger 45 such that the power is fed from power storage device 10 to outlet 60 (step S70).

On the other hand, if PM-ECU 65 determines in step S50 that power cost C1 is not more than power cost C2 (NO in step S50), PM-ECU 65 turns on switching relays 50, 55 (step S80). Thereby, the first power feeding path feeding the power from external power source 85 to outlet 60 is selected.

After step S70 or S80, PM-ECU 65 outputs to display unit 70 the display signal for displaying the selected power feeding path on display unit 70. Thereby, the selected power feeding path is displayed on display unit 70 (step S90).

As described above, in Embodiment 1, switching between the first power feeding path and the second power feeding path is performed based on the result of comparison between power cost C1 in the case where the power is fed from external power source 85 to outlet 60 through the first power feeding path and power cost C2 in the case where the power is fed from power storage device 10 to outlet 60 through the second power feeding path. Thereby, a power feeding path that is optimal in terms of the power cost can be selected. Therefore, according to Embodiment 1, suitable power feeding to outlet 60 provided in vehicle 100 can be implemented.

Further, according to Embodiment 1, since display unit 70 is provided, the user can be notified that outlet 60 is used with the power cost being suppressed.

[Embodiment 2]

Although switching between the first power feeding path and the second power feeding path is performed in Embodiment 1 based on the result of comparison between power costs C1 and C2 (yen/kWh), switching between the power feeding paths is performed in Embodiment 2 based on $CO_2$ emission factors (kg-$CO_2$/kWh).

An overall configuration of a vehicle in Embodiment 2 is identical to that of vehicle 100 in Embodiment 1 shown in FIG. 1. In addition, the configuration of a charger in Embodiment 2 is identical to that of charger 45 in Embodiment 1 shown in FIG. 2.

Figure 5:
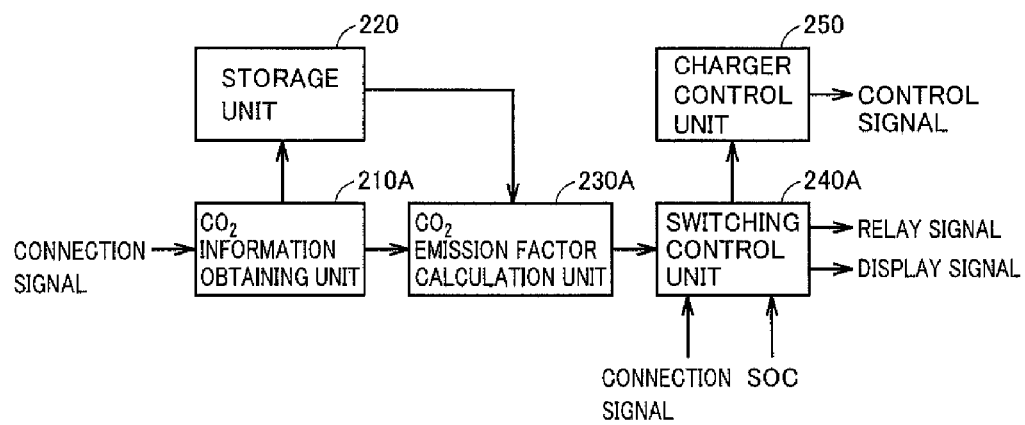
FIG. 5 is a functional block diagram of a PM-ECU in Embodiment 2.

FIG. 5 is a functional block diagram of a PM-ECU 65A in Embodiment 2. Referring to FIG. 5, PM-ECU 65A includes a $CO_2$ information obtaining unit 210A, storage unit 220, a $CO_2$ emission factor calculation unit 230A, a switching control unit 240A, and charger control unit 250.

$CO_2$ information obtaining unit 210A receives a connection signal indicating whether or not connector 80 of external power source 85 is connected to charge inlet 40. Upon receiving the connection signal, $CO_2$ information obtaining unit 210A obtains a $CO_2$ emission factor (kg-$CO_2$/kWh) of external power source 85 on that occasion. For example, $CO_2$ information obtaining unit 210A may obtain the $CO_2$ emission factor of external power source 85 by receiving information on the $CO_2$ emission factor at present transmitted momentarily from an electric power company and the like, using a communication device not shown. Alternatively, information on the $CO_2$ emission factor of external power source 85 for each time zone may be retained beforehand in the vehicle in the form of a map or the like, and $CO_2$ information obtaining unit 210A may obtain the $CO_2$ emission factor of external power source 85 in accordance with the time when it receives the connection signal.

Storage unit 220 stores a $CO_2$ emission factor of external power source 85 in a case where external charging by external power source 85 is performed. That is, storage unit 220 stores a $CO_2$ emission factor CU (kg-$CO_2$/kWh) of the power currently stored in power storage device 10, obtained by $CO_2$ information obtaining unit 210A during the external charging. $CO_2$ emission factor CU may be an average value during the external charging, or may be a value at prescribed timing during the external charging, such as at the start of the external charging.

$CO_2$ emission factor calculation unit 230A calculates a $CO_2$ emission factor U1 (kg-$CO_2$/kWh) in a case where the power is fed to outlet 60 through the first power feeding path, and a $CO_2$ emission factor U2 (kg-$CO_2$/kWh) in a case where the power is fed to outlet 60 through the second power feeding path. Specifically, $CO_2$ emission factor calculation unit 230A calculates a $CO_2$ emission factor of external power source 85 received from $CO_2$ information obtaining unit 210A in response to connection of external power source 85 to charge inlet 40, as $CO_2$ emission factor U1. On the other hand, concerning $CO_2$ emission factor U2, $CO_2$ emission factor calculation unit 230A reads $CO_2$ emission factor CU of the power currently stored in power storage device 10 from storage unit 220, and calculates $CO_2$ emission factor U2 by the following equation, considering the power conversion efficiency of charger 45:

$$U2 = CU \times (100/\text{conversion efficiency A}) \times (100/\text{conversion efficiency B}) \quad (2).$$

Switching control unit 240A generates a relay signal for switching between the first and second power feeding paths by a method described later, based on $CO_2$ emission factors U1, U2 calculated by $CO_2$ emission factor calculation unit 230A, the connection signal, and the SOC of power storage device 10, and outputs the generated relay signal to switching relays 50, 55.

Other functions of switching control unit 240A are identical to those of switching control unit 240 in Embodiment 1 shown in FIG. 3. Further, charger control unit 250 is as described in FIG. 3.

FIG. 6 is a flowchart for illustrating a procedure of a process performed in switching control unit 240A of PM-ECU 65A shown in FIG. 5. Referring to FIG. 6, this flowchart includes steps S35, S45, and S55, instead of steps S30, S40, and S50, respectively, in the flowchart shown in FIG. 4.

Specifically, if PM-ECU 65A determines in step S20 that the SOC is not less than the threshold value (YES in step S20), PM-ECU 65A calculates $CO_2$ emission factor U1 (kg-$CO_2$/kWh) of external power source 85, that is, $CO_2$ emission factor U1 in the case where the power is fed to outlet 60 through the first power feeding path (step S35). Subsequently, PM-ECU 65A calculates $CO_2$ emission factor U2 (kg-$CO_2$/kWh) of power storage device 10, that is, $CO_2$ emission factor U2 in the case where the power is fed to outlet 60 through the second power feeding path, using equation (2) described above (step S45).

Then, PM-ECU 65A compares $CO_2$ emission factor U1 with $CO_2$ emission factor U2, and determines whether or not $CO_2$ emission factor U1 is greater than $CO_2$ emission factor U2 (step S55). If PM-ECU 65A determines that $CO_2$ emission factor U1 is greater than $CO_2$ emission factor U2 (YES in step S55), PM-ECU 65A advances the process to step S60, and turns off switching relay 50 and turns on switching relay 55 (FIGS. 1, 2). Thereby, the second power feeding path feeding the power from power storage device 10 via charger 45 to outlet 60 is selected.

On the other hand, if PM-ECU 65A determines in step S55 that $CO_2$ emission factor U1 is not more than $CO_2$ emission factor U2 (NO in step S55), PM-ECU 65A advances the process to step S80, and turns on switching relays 50, 55. Thereby, the first power feeding path feeding the power from external power source 85 to outlet 60 is selected.

As described above, in Embodiment 2, switching between the first power feeding path and the second power feeding path is performed based on a result of comparison between $CO_2$ emission factor U1 in the case where the power is fed from external power source 85 to outlet 60 through the first power feeding path and $CO_2$ emission factor U2 in the case where the power is fed from power storage device 10 to outlet 60 through the second power feeding path. Thereby, a power feeding path that is optimal in terms of the $CO_2$ emission factor can be selected. Therefore, according to Embodiment 2, suitable power feeding to outlet 60 provided in vehicle 100 can be implemented.

Further, according to Embodiment 2, the user can be notified, by display unit 70, that outlet 60 is used with the $CO_2$ emission factor being suppressed.

Although switching relay 50 is provided between charge inlet 40 and charger 45 in Embodiments 1, 2 described above, a ground-fault interrupter provided in a charge cable connected to connector 80 may be used instead of switching relay 50. In this case, an operation of the ground-fault interrupter in the charge cable can be controlled from PM-ECU 65 (65A) in vehicle 100, using for example power line communication (PLC) or the like.

Further, although vehicle 100 has been described above as an electrically powered vehicle having motor generator 25 as a motive power source, vehicle 100 may be an electric vehicle having only motor generator 25 as a motive power source, or may be a hybrid vehicle further equipped with an engine (not shown) in addition to motor generator 25.

It is to be noted that, in the above description, charge inlet 40 corresponds to one embodiment of a "power receiving unit" in the present invention, and switching relay 50, 55 corresponds to one embodiment of a "switching circuit" in the present invention. Further, PM-ECU 65, 65A corresponds to one embodiment of a "control device" in the present invention.

It should be understood that the embodiments disclosed herein are illustrative and non-restrictive in every respect. The scope of the present invention is defined by the scope of the claims, rather than the above description of the embodiments, and is intended to include any modifications within the scope and meaning equivalent to the scope of the claims.

Reference Signs List

10: power storage device, 15: SMR, 20: PCU, 25: motor generator, 30: drive wheels, 35: MG-ECU, 40: charge inlet, 45: charger, 47: charge relay, 50, 55: switching relay, 60: outlet, 65, 65A: PM-ECU, 70: display unit, 80: connector, 85: external power source, 100: vehicle, 110, 140: AC/DC conversion unit, 120: DC/AC conversion unit, 130: insulation transformer, 210: power unit price obtaining unit, 210A: CO2 information obtaining unit, 220: storage unit, 230: power cost calculation unit, 230A: CO2 emission factor calculation unit, 240, 240A: switching control unit, 250: charger control unit.

The invention claimed is:

1. A power feeding device for feeding power to an outlet provided in a vehicle, comprising:
    a power receiving unit receiving supply power supplied from an external power source external to the vehicle;
    a rechargeable power storage device ; a charger provided between said power receiving unit and said power storage device, and configured to convert said supply power into charging power for said power storage device and charge said power storage device;
    a switching circuit configured to switch between a first power feeding path for feeding power from said power receiving unit to said outlet and a second power feeding path for feeding power from said power storage device to said outlet; and
    a control device controlling said switching circuit to switch between said first power feeding path and said second power feeding path, based on a result of comparison between a first evaluation value indicating a value of a predetermined index in a case where the power is fed to said outlet through said first power feeding path and a second evaluation value indicating a value of said index in a case where the power is fed to said outlet through said second power feeding path, wherein said index is a power cost or a carbon dioxide emission factor.

2. The power feeding device according to claim 1, wherein said index is the power cost.

3. The power feeding device according to claim 2, wherein said control device controls said switching circuit to select one of said first and second power feeding paths that has a lower power cost.

4. The power feeding device according to claim 1, wherein said index is the carbon dioxide emission factor.

5. The power feeding device according to claim 4, wherein said control device controls said switching circuit to select one of said first and second power feeding paths that has a lower carbon dioxide emission factor.

6. The power feeding device according to claim 1, wherein, if said power storage device has a state of charge lower than a predetermined threshold value, said control device controls said switching circuit to select said first power feeding path.

7. The power feeding device according to claim 1, wherein
    said switching circuit is provided between said power receiving unit and said charger,
    said outlet is connected to said switching circuit,
    said charger is configured to be capable of converting power bi-directionally, and
    said second power feeding path includes said charger.

8. The power feeding device according to claim 7, wherein said control device calculates said second evaluation value, considering a power conversion efficiency of said charger.

9. The power feeding device according to claim 1, further comprising a display unit for displaying to a user which of said first power feeding path and said second power feeding path is selected.

10. A vehicle, comprising:
    the power feeding device according to claim 1; and
    an outlet recieving power from said power feeding device.

11. A power feeding method for feeding power to an outlet provided in a vehicle, said vehicle including
    a power receiving unit receiving supply power supplied from an external power source external to the vehicle,
    a rechargeable power storage device, a charger provided between said power receiving unit and said power storage device, and configured to convert said supply power into charging power for said power storage device and charge said power storage device, and
    a switching circuit configured to switch between a first power feeding path for feeding power from said power receiving unit to said outlet and a second power feeding path for feeding power from said power storage device to Said outlet, said power feeding method comprising the steps of:
    calculating a first evaluation value indicating a value of a predetermined index in a case where the power is fed to said outlet through said first power feeding path;
    calculating a second evaluation value indicating a value of said index in a case where the power is fed to said outlet through said second power feeding path; and
    switching between said first power feeding path and said second power feeding path by controlling said switching circuit based on a result of comparison between said first evaluation value and said second evaluation value, wherein said index is a power cost or a carbon dioxide emission factor.

12. The power feeding method according to claim 11, wherein said index is the power cost.

13. The power feeding method according to claim 11, wherein said index is the carbon dioxide emission factor.

14. The power feeding method according to claim 11, wherein
    said switching circuit is provided between said power receiving unit and said charger,
    said outlet is connected to said switching circuit,
    said charger is configured to be capable of converting power bi-directionally,
    said second power feeding path includes said charger, and
    the step of calculating said second evaluation value includes the step of calculating said second evaluation value, considering a power conversion efficiency of said charger.

15. The power feeding method according to claim 11, further comprising the step of displaying to a user which of said first power feeding path and said second power feeding path is selected.

* * * * *